MORRETT & WATTS.
Roller Wagon-Skein.
No. 80,758.　　　　　　　　　　　　　　　　Patented Aug. 4, 1868.
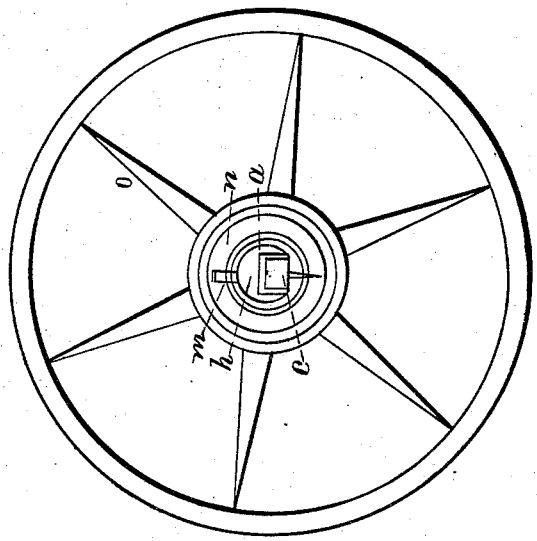
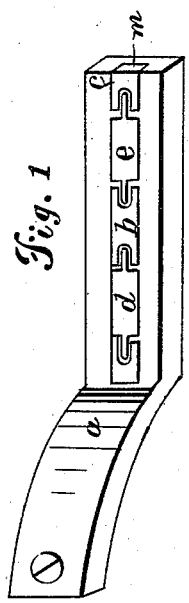
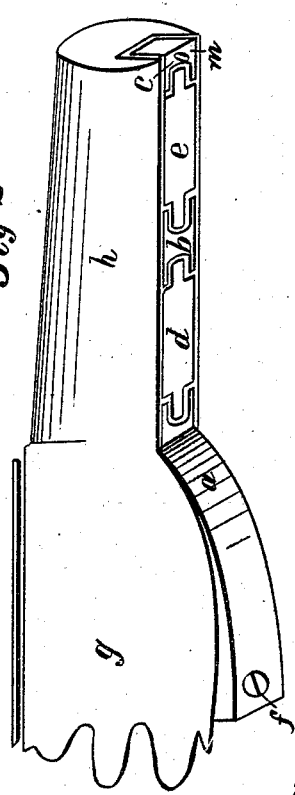
Witnesses　　　　　　　　　　　　　　　　Inventors;

United States Patent Office.

JOHN W. MORRETT AND HIRAM WATTS, OF SHEPHERDSTOWN, PENNSYLVANIA.

Letters Patent No. 80,758, dated August 4, 1868.

IMPROVEMENT IN ROLLER WAGON-SKEIN.

The Schedule referred to in these Letters Patent and making part of the same.

TO ALL WHOM IT MAY CONCERN:

Be it known that we, JOHN W. MORRETT and HIRAM WATTS, of Shepherdstown, Cumberland county, Pennsylvania, have invented a new and useful Improved Roller Wagon-Skein; and we do hereby declare that the following is a full, clear, and exact description of the construction and operation of the same, reference being had to the annexed drawings, making a part of this specification, in which—

Figure 1 is a perspective view of the skein itself.

Figure 2 is a perspective view of the skein, when fastened in its proper position on the lower side of the axle.

Figure 3 is an end view of the skein when the axle on which it is fastened is inserted in the hub of the wheel.

In the construction of the skein, we take the rectangular bar, $a$, of iron, or any other suitable metal, of a length, width, and thickness in proportion to the size of the axle and wheel. A part of this bar we embed horizontally in the lower side of the axle $h$, bending it in the form of an arc from $x$, the point at which it leaves the axle, and curves along, partially embedded in the axle-tree $g$, to which it is fastened by the screw $f$. In the part of the skein embedded in the axle $h$, we construct a trapezoidal gutter, in which we place the rollers $d$ and $e$, and the trapezoidal blocks $b$ and $c$, in the ends of which rest the rollers aforementioned. Through the block $c$ passes the linchpin $m$, the extremities of which are seen in the wheel $o$, resting against the hub at $n$.

The wheel $o$, the axle $h$, and axle-tree $g$, are constructed in the ordinary form, hence the skein shown in fig. 1, complete and unattached, can be applied to any kind of wagon.

The rollers $d$ and $e$ turn the friction of the hub $n$ upon the axle $h$, from sliding to rolling friction. The advantage of this, in a saving of propelling power, is at once apparent.

What we claim, and desire to secure by Letters Patent of the United States, is—

The rectangular metallic bar $a$, embedded in the axle $h$, and curving at $x$, in an arc along the axle-tree $g$, and fastened thereto by the screw $f$, the rollers $d$ and $e$ resting their axles in the ends of the trapezoidal blocks $b$ and $c$, which slide and are adjusted in the trapezoidal gutter in the skein, all constructed and operating in the manner and for the purpose herein set forth.

JOHN W. MORRETT,
HIRAM WATTS.

Witnesses:
D. M. BAILEY,
FRANK E. BELZHOOVER.